US012672657B2

(12) United States Patent
Peters et al.

(10) Patent No.: US 12,672,657 B2
(45) Date of Patent: Jul. 7, 2026

(54) COMPOSITION FOR ELECTROLYTIC TREATMENT OF MYCOTOXIN, GLYPHOSATE, AND MICROBIAL CONTAMINATION COMPRISING AN ELECTROLYZED CARRIER FLUID WITH A REDUCTIVE POTENTIAL

(71) Applicant: GUARDIAN PARTNERS, LLC, Denver, CO (US)

(72) Inventors: Michael J. Peters, Bailey, CO (US); John D. Breedlove, Longmont, CO (US); Darin Jensen, Denver, CO (US); Christopher M. Peters, Bailey, CO (US); S. Robert Mayer, Denver, CO (US); Donald H. Davis, Denver, CO (US); Kyle Peters, Denver, CO (US)

(73) Assignee: STRATEGIC RESOURCE OPTIMIZATION, INC., Bailey, CO (US)

( * ) Notice: Subject to any disclaimer, the term of this patent is extended or adjusted under 35 U.S.C. 154(b) by 315 days.

(21) Appl. No.: 17/815,108

(22) Filed: Jul. 26, 2022

(65) Prior Publication Data

US 2023/0026635 A1     Jan. 26, 2023

Related U.S. Application Data

(60) Provisional application No. 63/256,988, filed on Oct. 18, 2021, provisional application No. 63/248,288, filed on Sep. 24, 2021, provisional application No. 63/225,883, filed on Jul. 26, 2021.

(51) Int. Cl.
| | |
|---|---|
| *C11D 7/06* | (2006.01) |
| *A23B 2/60* | (2025.01) |
| *A23B 2/779* | (2025.01) |
| *A23B 2/788* | (2025.01) |

(52) U.S. Cl.
CPC .............. *A23B 2/788* (2025.01); *A23B 2/605* (2025.01); *A23B 2/779* (2025.01)

(58) Field of Classification Search
CPC .. C11D 7/06; C11D 3/48; C11D 7/329; C11D 7/34; C11D 9/42; C11D 2111/14; C11D 2111/48; C11D 1/12; C11D 3/3942
See application file for complete search history.

(56) References Cited

U.S. PATENT DOCUMENTS

| | | | |
|---|---|---|---|
| 3,816,276 | A | 6/1974 | Ichiki et al. |
| 4,853,040 | A | 8/1989 | Mazur et al. |
| 5,932,171 | A | 8/1999 | Malchesky |
| 6,478,947 | B2 | 11/2002 | Nagasaku et al. |
| 6,565,736 | B2 | 5/2003 | Park et al. |
| 6,623,615 | B1 | 9/2003 | Morisawa et al. |
| 7,011,739 | B2 | 3/2006 | Harkins et al. |
| 7,722,830 | B2 | 5/2010 | Kimura et al. |
| 7,849,788 | B2 | 12/2010 | Macaluso |
| 7,887,641 | B2 | 2/2011 | Man et al. |
| 8,007,654 | B2 | 8/2011 | Field et al. |
| 8,062,500 | B2 | 11/2011 | Sumita |
| 8,157,981 | B2 | 4/2012 | Peters et al. |
| 8,227,015 | B2 | 7/2012 | Bruinsma et al. |
| 8,333,883 | B2 | 12/2012 | Peters et al. |
| 8,394,253 | B2 | 3/2013 | Peters et al. |
| 9,096,450 | B2 | 8/2015 | Andrews et al. |
| 9,107,967 | B2 | 8/2015 | O'Connell |
| 9,260,676 | B2 | 2/2016 | Faulconbridge et al. |
| 9,445,602 | B2 | 9/2016 | Peters et al. |
| 9,765,268 | B2 | 9/2017 | Rogers |
| 10,512,855 | B2 | 12/2019 | Faulconbridge et al. |
| 10,676,663 | B2 | 6/2020 | Breedlove et al. |
| 2003/0089618 | A1 | 5/2003 | Satoh et al. |
| 2005/0244556 | A1* | 11/2005 | Karren ...................... C14C 1/00 205/701 |
| 2006/0260953 | A1* | 11/2006 | Hopkins ................. C02F 1/467 205/701 |
| 2006/0263240 | A1 | 11/2006 | Hopkins |

(Continued)

FOREIGN PATENT DOCUMENTS

| | | |
|---|---|---|
| CN | 101779754 B | 7/2012 |
| CN | 105838496 A | 8/2016 |

(Continued)

OTHER PUBLICATIONS

Sun, Chao, et al., "Role of aqueous chlorine dioxide in controlling the growth of Fusarium graminearum and its application on contaminated wheat", LWT—Food Science and Technology, vol. 84, 2017, pp. 555-561 (6 pages).

Ding, Tian, et al., "Electrolyzed Water in Food: Fundamentals and Applications", Springer Nature Singapore Pte Ltd. and Zheijian University Press, Hangzhou 2018, https://doi.org/10.1007/978-981-13-3807-6, 2019, 280 pages.

Ewatersystems, "Electrolysed Water: A natural alternative for removing chemical residue on food", https://ewatersystems.com/ewaterworldarchive/2018/10/29/electrolysed-water-a-natural-alternative-to-agricultural-chemical-residue, Oct. 29, 2018, 4 pages.

Fan, Sufang, et al., "Removal of aflatoxin B(1) in edible plant oils by oscillating treatment with alkaline electrolysed water", Food Chemistry, vol. 141.3, Dec. 1, 2013, 3118-3123 (2-pages).

(Continued)

*Primary Examiner* — Charles I Boyer

(74) *Attorney, Agent, or Firm* — HOLZER PATEL DRENNAN

(57) ABSTRACT

Compositions, methods, systems and equipment capable of significantly reducing glyphosate, microbial, mycotoxin and other contaminant levels in various food commodities, such as, but not limited to, grains (e.g., corn, wheat, oats barley, rye, sorghum, millet, rice, etc.), nuts, seeds, and other agricultural products, are described. A contaminant treatment fluid suitable for use in reducing contaminant levels in foods may include an electrolyzed carrier fluid having a reductive potential with an oxidizer, a carbohydrate, and a sulfonic acid functional group-containing compound. Contacting food commodities with the contaminant treatment fluid reduces contaminant levels in the food commodity.

20 Claims, 13 Drawing Sheets

(56)            References Cited

U.S. PATENT DOCUMENTS

| | | | | |
|---|---|---|---|---|
| 2009/0148889 A1* | 6/2009 | Nielsen | ................... | C12N 9/54 |
| | | | | 435/320.1 |
| 2009/0311137 A1 | 12/2009 | Field | | |
| 2010/0119616 A1 | 5/2010 | Chen et al. | | |
| 2014/0018279 A1* | 1/2014 | Song | ................... | C11D 3/0073 |
| | | | | 510/224 |
| 2014/0154373 A1* | 6/2014 | Gobet | ................... | A23B 2/605 |
| | | | | 426/244 |
| 2015/0051135 A1 | 2/2015 | Hermann et al. | | |
| 2015/0105309 A1* | 4/2015 | Smith | ................... | C11D 3/046 |
| | | | | 510/463 |
| 2015/0196027 A1 | 7/2015 | Martin | | |
| 2015/0375025 A1 | 12/2015 | Willey et al. | | |
| 2016/0029602 A1* | 2/2016 | Nakamoto | ........... | A01K 43/005 |
| | | | | 134/56 R |
| 2016/0040305 A1 | 2/2016 | Nuñez Montalvo | | |
| 2016/0044926 A1 | 2/2016 | Peters et al. | | |
| 2017/0267553 A1* | 9/2017 | Gardner | ................ | A23B 2/788 |
| 2018/0305604 A1 | 10/2018 | Breedlove et al. | | |
| 2019/0055142 A1 | 2/2019 | Moyer et al. | | |
| 2019/0313879 A1* | 10/2019 | Al-Bayati | ........... | A47L 15/0015 |
| 2020/0131057 A1 | 4/2020 | Jansen | | |
| 2021/0000107 A1 | 1/2021 | Politopoulos et al. | | |
| 2021/0214248 A1 | 7/2021 | Echeverry Campos | | |

FOREIGN PATENT DOCUMENTS

| | | |
|---|---|---|
| CN | 106006852 A | 10/2016 |
| CN | 107156605 A | 9/2017 |
| CN | 107244717 A | 10/2017 |
| CN | 105418784 B | 3/2018 |
| CN | 109730239 A | 5/2019 |
| CN | 110343568 A | 10/2019 |
| CN | 111227164 A | 6/2020 |
| CN | 107012182 B | 2/2021 |
| GB | 191412308 A | 6/1915 |
| GB | 191416664 A | 7/1915 |
| JP | 61231962 A2 | 10/1986 |
| JP | 2006320305 A2 | 11/2006 |
| JP | 4607296 B2 | 10/2010 |
| JP | 4801945 B2 | 8/2011 |
| KR | 100532860 B1 | 12/2005 |
| MD | 980197 A | 6/2000 |
| RU | 2563935 C2 | 9/2015 |
| WO | 2006102680 A2 | 9/2006 |

OTHER PUBLICATIONS

Hao, J., et al., "Reduction of Pesticide Residues on Fresh Vegetables with Electrolyzed Water Treatment", College of Food Science and Nutritional Engineering, China Agricultural Univ., Beijing, P.R. China, Journal of Food Science, vol. 76 (4), May 5, 2011, pp. C520-C524, 6 pages.

Li, Zhi-Hao, "Effect of alkaline electrolyzed water on physicochemical and structural properties of apricot protein solate", Food Sci Biotechnol (2019), vol. 28(1), Aug. 3, 2018, pp. 15-23 (9 pages).

Shimamura, Yuko, et al., "The application of alkaline and acidic electrolyzed water in the sterilization of chicken breasts and beef liver", Food Science & Nutrition, vol. 4(3) (https://www.ncbi.nlm. nih.gov/pmc/articles/PMC4867763/), Nov. 1, 2015, 431-440 (19 pages).

Wu, Yangliu, et al., "Comparison of Different Home/Commercial Washing Strategies for Ten Typical Pesticide Residue Removal Effects in Kumquat, Spinach and Cucumber", Int. J. Environ. Res. Public Health 2019, vol. 16, Feb. 6, 2019, 1-20 (20 pages).

Feng, P., et al., "Biomass-based activated carbon and activators: Preparation of activated carbon from corncob by chemical activation with biomass pyrolysis liquids", ACS Omega, 5(37), https:// doi.org/10.1021/acsomega.Oc03494, Sep. 9, 2020, pp. 24064-24072.

International Search Report and Written Opinion issued in PCT Application No. PCT/US2022/074155, Mailed Date: Dec. 15, 2022, 15 pages.

* cited by examiner

| Aflatoxin Time Trial | | | |
|---|---|---|---|
| Sample | Resp. | Percent Reduction | Estimated PPB Conc. |
| Standard | 8780211.27 | - | 810.38 |
| 15 Sec. | 3620151.79 | -58.76919495 | 309.98 |
| 30 Sec. | 1712565.84 | -80.49516366 | 143.3 |
| 60 Sec. | 31425.6509 | -99.64208548 | 2.64 |
| 90 Sec. | 21964.3277 | -99.74984283 | 1.83 |
| 120 Sec. | 3104.62316 | -99.96464068 | 0.21 |

Acquisition Time (min)

| Fumonisin Time Trial | | |
|---|---|---|
| Name | Resp. | Percent Reduction |
| Standard | 3900243.307 | 0 |
| 15 Sec. | 1486072.486 | -61.89795433 |
| 30 Sec. | 658631.0818 | -83.11307706 |
| 45 Sec. | 648476.1263 | -83.37344429 |
| 60 Sec. | 570767.4652 | -85.36584976 |
| 75 Sec. | 503609.7703 | -87.08773452 |
| 90 Sec. | 477627.9631 | -87.75389314 |
| 105 Sec. | 434572.882 | -88.85780071 |
| 120 Sec. | 386861.5895 | -90.08109087 |

| Deoxynivalenol (Vomitoxin) Treatment Raito Trial | | |
|---|---|---|
| Name | Resp. | Percent Reduction |
| Standard | 402600.5866 | 0 |
| 2 min. | 215.8867103 | -99.94637695 |

| Sample | Zearalenone-Neg Results | |
|---|---|---|
| Name | Resp. | Percent Reduction |
| Zear Control | 245648.8064 | 0 |
| Zear - 1 | 26154.58066 | -89.35285661 |
| Zear -2 | 21149.0853 | -91.39051982 |

FIG. 8B

Glyphosate Wheat Treatment Analysis

| Glyphosate Reduction | | | |
|---|---|---|---|
| Sample Name | Control Grain (mg/kg) | Treated Grain (mg/kg) | Reduction (%) |
| Wheat A | 0.44 | 0.13 | 70.5 |
| Wheat B | 0.27 | 0.12 | 55.6 |
| Wheat C | 0.09 | 0.02 | 77.8 |
| Wheat D | 1.1 | 0.42 | 61.8 |

FIG. 9

Concentrations of Enterococcus spp. in Corn Before and After Treatment with Contaminant Treatment Fluid

| Treatment Condition | Sample No. | CFU/g | log10 CFU/g |
|---|---|---|---|
| Control | 1 | 1,260,000 | 6.10 |
| | 2 | 1,290,000 | 6.11 |
| | 3 | 540,000 | 5.73 |
| | 4 | 1,140,000 | 6.06 |
| | 5 | 510,000 | 5.71 |
| | | Average | 5.94 |
| Contaminant Treatment Fluid | 1 | 56,700 | 4.75 |
| | 2 | 54,000 | 4.73 |
| | 3 | 1,200 | 3.08 |
| | 4 | 1,200 | 3.08 |
| | 5 | 1,600 | 3.20 |
| | | Average | 3.77 |
| | Average log Reduction | | 2.17 |

FIG. 10

COMPOSITION FOR ELECTROLYTIC TREATMENT OF MYCOTOXIN, GLYPHOSATE, AND MICROBIAL CONTAMINATION COMPRISING AN ELECTROLYZED CARRIER FLUID WITH A REDUCTIVE POTENTIAL

CROSS-REFERENCE TO RELATED APPLICATIONS

The present application claims priority under 35 U.S.C. § 119(e) to U.S. Provisional Patent Application No. 63/225,883, filed Jul. 26, 2021, U.S. Provisional Application No. 63/248,288, filed Sep. 24, 2021, and U.S. Provisional Patent Application No. 63/256,988, filed Oct. 18, 2021, each of which is incorporated herein by reference in its entirety.

BACKGROUND

Raw food commodities can be tainted with a broad spectrum of natural or manufactured chemical contaminants. These may include various ingredients used in pesticides and herbicides (e.g., glyphosates), bacteria and other microbes, and mold metabolites known as mycotoxins. These contaminants are commonly found on grains such as corn, wheat, oats, barley, rye, sorghum, millet, rice, etc. They may also be found on nuts, seeds and numerous other agricultural products, as well as numerous other types of raw food commodities.

Glyphosates—In modern agricultural practices, the chemical glyphosate is used broadly as the main ingredient in herbicides used to combat weeds and grasses that compete with field crops. Pesticides including glyphosate are also among the most commonly used agricultural pesticides in the world. Glyphosate is even commonly used as a desiccant prior to harvest. As a result, crops are often contaminated with glyphosate. The contamination of crops with glyphosates is problematic due to the health risks posed by glyphosates. For example, there are ample animal research studies that suggest that high levels of glyphosate can damage organs, the nervous system, and reproductive system. Research also suggests that glyphosate has a carcinogenic effect on humans. As such, regulatory agencies have begun to set maximum residue limits (MRLs) for crops that have been treated with a glyphosate containing herbicide. If glyphosate is found in high enough concentrations in either incoming grain or processed grain, the grain must be discarded or blended with grain having a lower concentration of the pesticide.

Microbials—Similar health issues are posed by microbials, such as pathogens, bacteria, yeast, and molds, which can also be commonly found on many food commodities. These contaminants can be activated in temper or other wet processing systems commonly used in food processing. This may cause spores and the like to enter a vegetative state, thus adding to the contaminant load. Untreated, these various contaminants can also limit the shelf life of unfinished products made with flour. According to the CDC, several pathogenic *E. Coli* infections have been linked to contaminated flour in the past few years. These events have required recalls of flour, cookie dough and brownie mixes in numerous states.

Mycotoxins—Related to the presence of microbials such as fungi on food commodities, mycotoxins are toxic secondary metabolites produced by organisms of the fungus kingdom, and are capable of causing disease and death in both humans and other animals when ingested. The term 'mycotoxin' is usually reserved for the toxic chemical products produced by fungi that readily colonize crops. Examples of mycotoxins causing human and animal illness include aflatoxin, citrinin, fumonisin, vomitoxin, ochratoxin A, and zearalenone. Mycotoxins have appeared in some form in nearly all grain being distributed throughout the US. The particularly insidious aflatoxin is regulated by the FDA while many other mycotoxins are regulated through buyer/seller contracts.

Further compounding the presence of these contaminants on food commodities is that some commonly used food processing techniques can lead to concentrating these contaminants on food commodities. For example, traditional processing techniques used in an ethanol plant may process corn in such a way that byproducts produced by the process (such as dried distiller's grain (DDG) (also known as DDGS— dried distiller's grains with solubles)) have concentrated levels of contaminants. This is due at least in part to the fact that the fermentation process used in processing corn to create ethanol does not deleteriously affect, e.g., mycotoxins present on the corn used at the start of the process. As such, the mycotoxins persist through the process and end up concentrated in the DDGS as other components of the process are converted and/or separated out.

Few options currently exist for effectively removing contaminants such glyphosates, microbials, and mycotoxins, from food commodities such as grain. While some in the industry have argued that contaminants such as glyphosates are degraded during milling or through natural weather events, there is little evidence supporting these theories The proper treatment and decontamination of food commodities is necessary to generate the highest possible product quality, from both an economic standpoint and a human and animal safety standpoint. As such, a need exists for methods, systems, materials and equipment capable of effectively removing contaminants such as glyphosate, microbials and mycotoxins from food commodities.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present disclosure relates to compositions, methods, systems and equipment capable of significantly reducing glyphosate, microbial, mycotoxin and other contaminant levels in various food commodities, such as, but not limited to, grains (e.g., corn, wheat, oats barley, rye, sorghum, millet, rice, etc.), nuts, seeds, and other agricultural products.

In some embodiments, a method of lowering contaminant levels in a food commodity generally includes a step of mixing an electrolyzed carrier fluid having a reductive potential with an oxidizer, a carbohydrate, and a sulfonic acid functional group-containing compound to form a contaminant treatment fluid; contacting the food commodity with the contaminant treatment fluid; and separating the contaminant treatment fluid from the food commodity.

In some embodiments, a contaminant treatment fluid suitable for use in treating food commodities to thereby lower contaminant levels on the food commodities generally includes an electrolyzed carrier fluid comprising a hydroxide brine; an oxidizer; a carbohydrate; and a sulfonic acid functional group-containing compound.

In some embodiments, a contaminant treatment system suitable for lowering contaminant levels on food commodities generally includes an electrolytic cell, the electrolytic cell generally including: a vessel having a fluid inlet to receive a hydroxide brine; a pair of electrodes comprising an anode and a cathode within the vessel, each operably connected to a power source to apply a potential therebetween; a membrane within the vessel separating the anode and the cathode; and means for applying the potential to the pair of electrodes to produce a first electrolyzed carrier fluid and a second electrolyzed carrier fluid in the vessel; the vessel having a first outlet located proximate the cathode to remove the first electrolyzed carrier fluid and a second outlet located proximate the anode to remove the second electrolyzed carrier fluid from the vessel. The contaminant treatment system further includes: a mixing vessel in fluid communication with the first outlet to receive the first electrolyzed carrier fluid, the mixing vessel comprising a contaminant treatment fluid outlet; a first additive storage vessel, the first additive storage vessel storing an oxidizer and being in fluid communication with the mixing vessel; a second additive storage vessel, the second additive storage vessel storing a carbohydrate and being in fluid communication with the mixing vessel; a third additive storage vessel, the third additive storage vessel storing a sulfonic acid functional group-containing compound and being in fluid communication with the mixing vessel; a neutralization system in fluid communication with the first outlet to receive the second electrolyzed carrier fluid; and a treatment vessel in fluid communication with the contaminant treatment fluid outlet of the mixing vessel, the treatment vessel being configured to receiving the food commodity and contact the food commodity with the contaminant treatment fluid.

These and other aspects of the technology described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

BRIEF DESCRIPTION OF THE FIGURES

Non-limiting and non-exhaustive embodiments of the disclosed technology, including the preferred embodiment, are described with reference to the following figures, wherein like reference numerals refer to like parts throughout the various views unless otherwise specified.

4

Figures 5A, 5B:
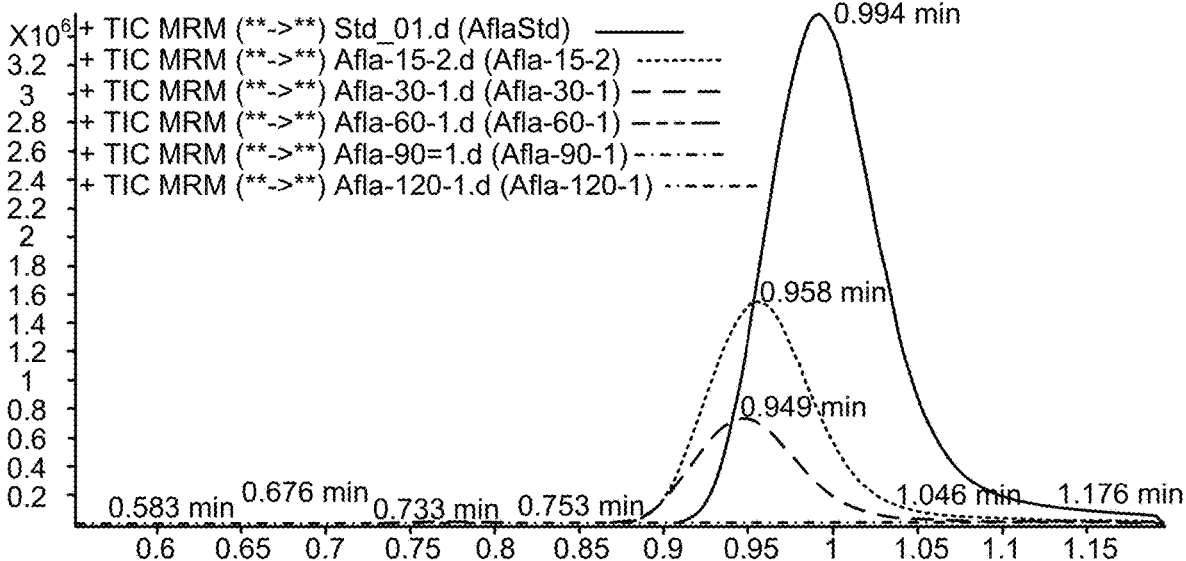
Figure 5C:
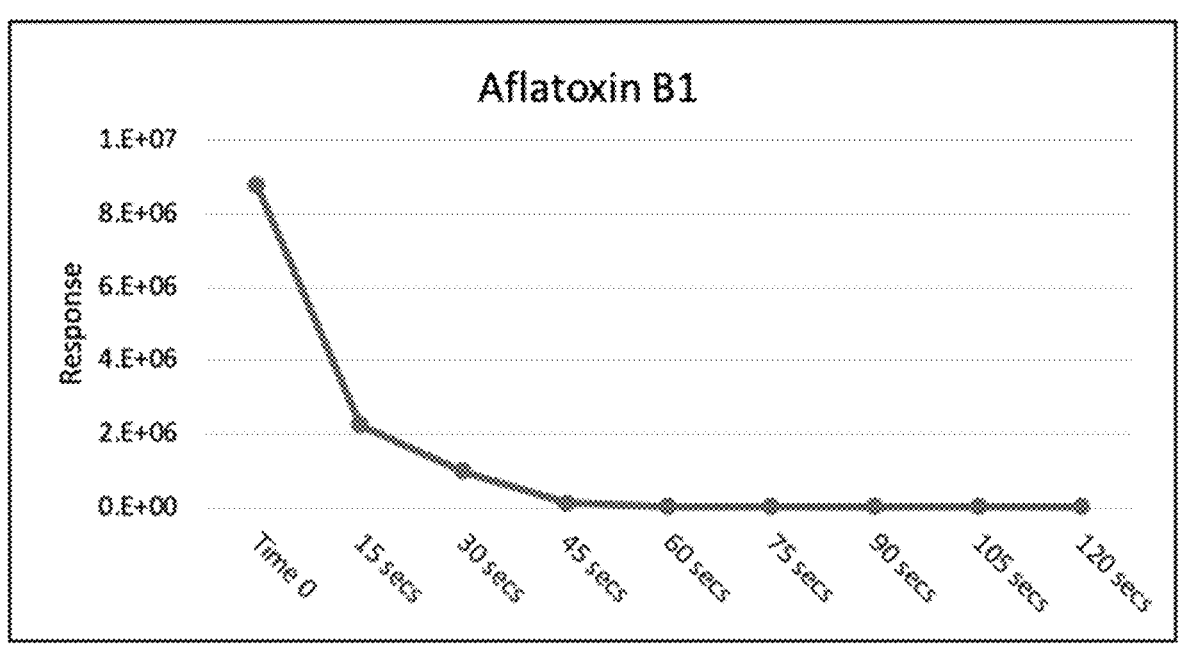

FIGS. 5A-5C are a series of graphs and tables providing experimental data relating to the use of the technology described herein in the treatment of liquid aflatoxin.

Figure 6A:
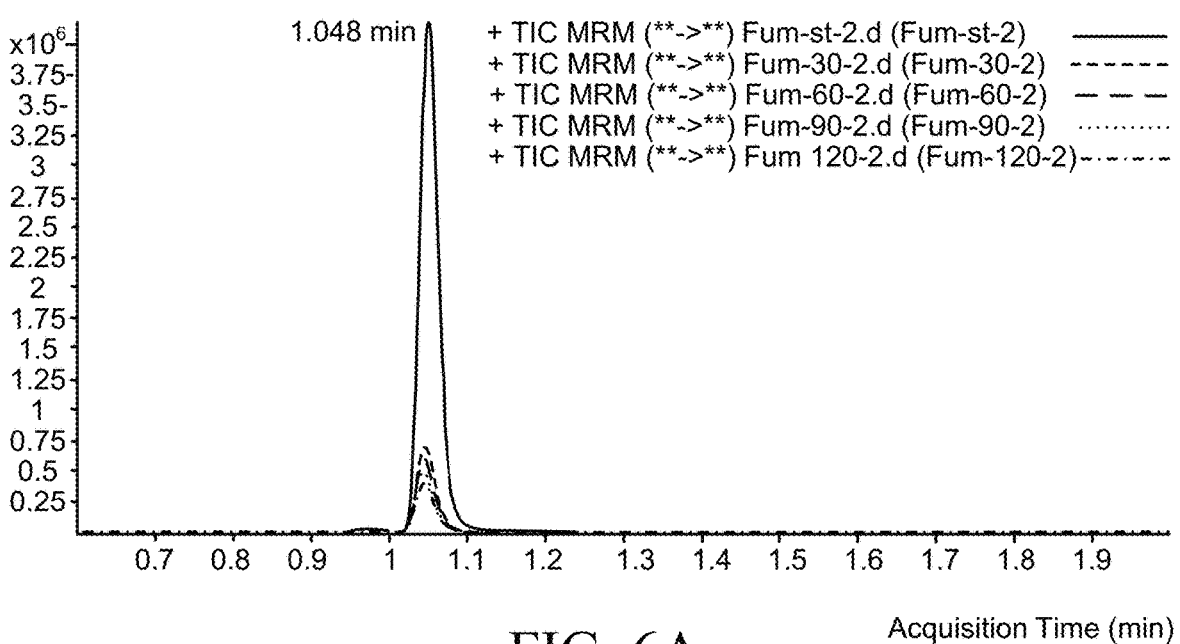
Figures 6B, 6C:
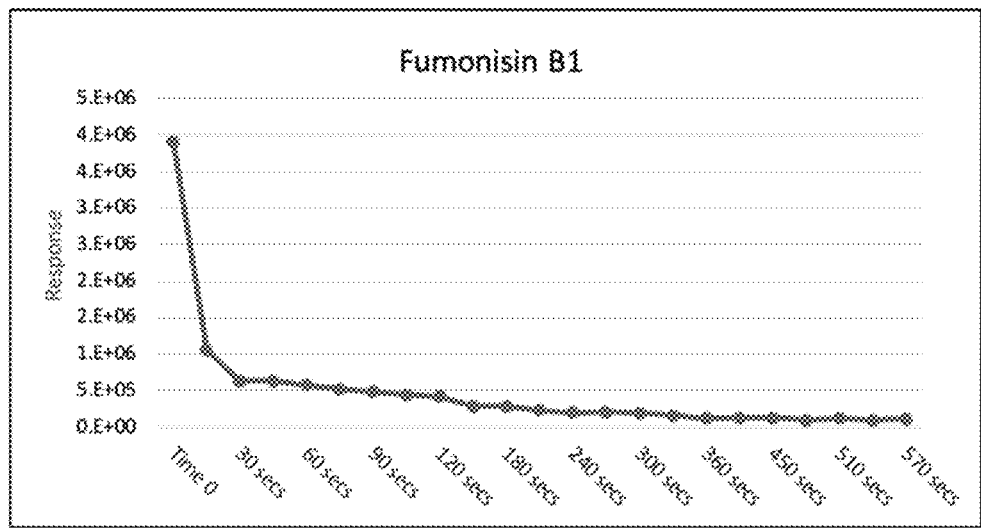

FIGS. 6A-6C are a series of graphs and tables providing experimental data relating to the use of the technology described herein in the treatment of liquid fumonisin B 1.

Figures 7A, 7B:
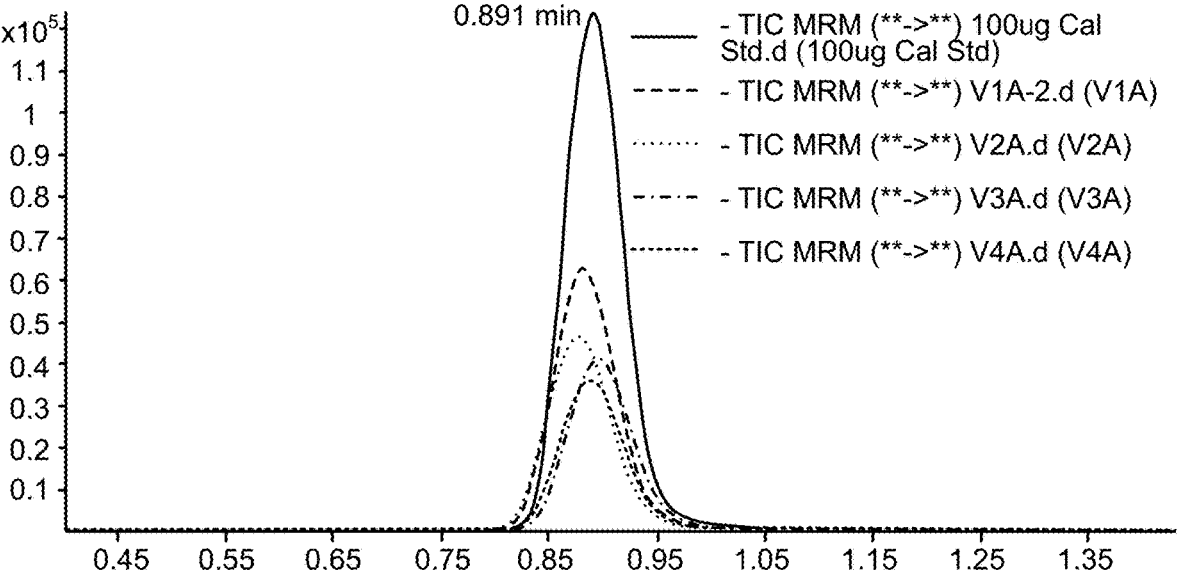
Figure 7C:
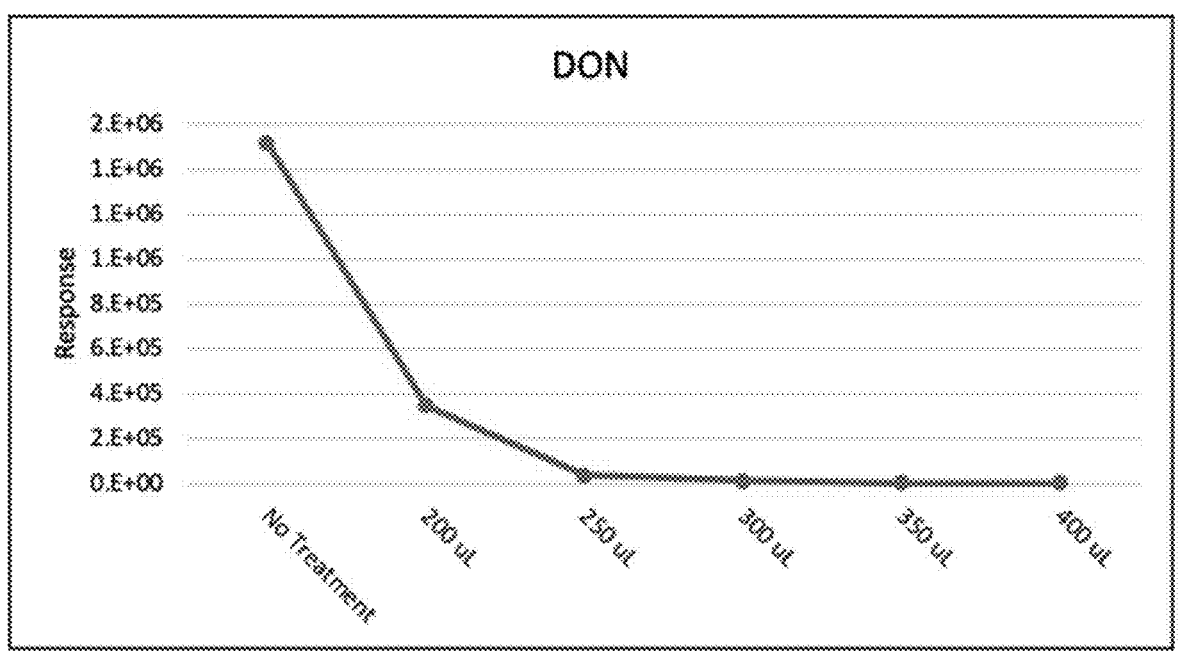

FIGS. 7A-7C are a series of graphs and tables providing experimental data relating to the use of the technology described herein in the treatment of liquid deoxynivalenol.

Figure 8A:
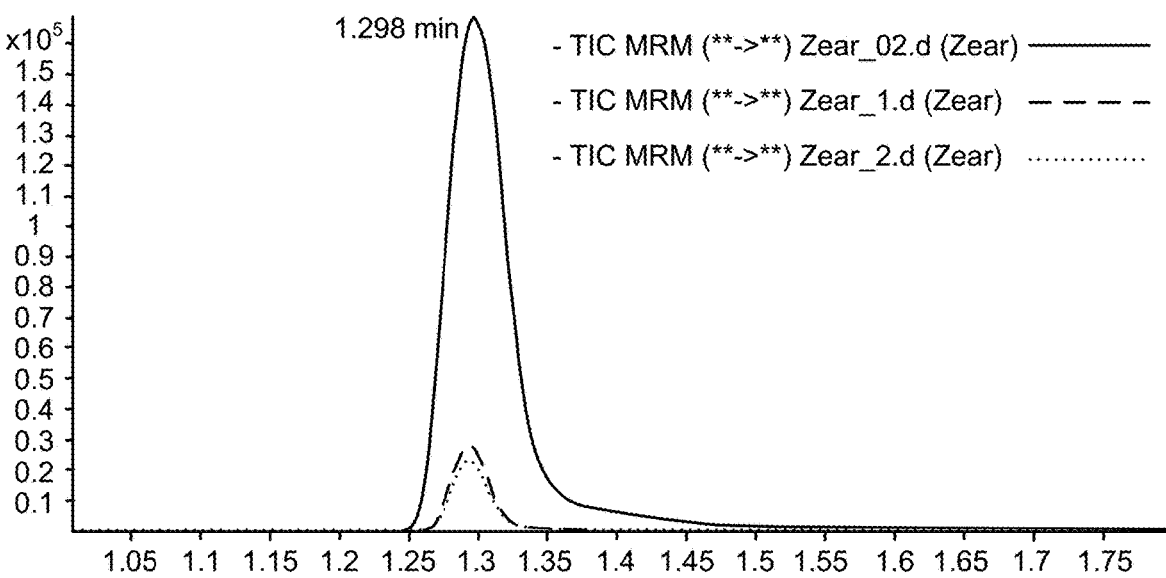

FIGS. 8A and 8B are a graph and table providing experimental data relating to the use of the technology described herein in the treatment of liquid zearalenone.

FIG. 9 is a table providing experimental data relating to the use of the technology described herein in the treatment of powdered glyphosate.

FIG. 10 is a table providing experimental data relating to the use of the technology descried herein in the treatment of *Enterococcus* spp. on corn.

DETAILED DESCRIPTION

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense.

The present disclosure is directed to methods, compositions, systems and equipment for lowering contaminant load on food commodities. Specific, though non-limiting, contaminants that can treated using the technology described herein include glyphosate, microbials and mycotoxins. The food commodities that may be treated using the technology described herein is generally not limited. In some embodiments, the methods, compositions, systems and equipment described herein is well suited for lowering contaminant levels on agricultural products, such as grains, seeds, and nuts, etc.

The technology described herein generally utilizes an electrolytic system for producing an electrolyzed carrier fluid to which various additives can be added. The electrolyzed carrier fluid is capable of directly altering the electrochemical state of the solids and/or contaminants and changing the Zeta potential at the solid-liquid interface between the solids and the carrier fluid. Contaminants can thus be separated from the solids, after which they may be destroyed via reaction with the additives present in the carrier fluid.

The electrolytic system described herein adjusts the electrochemical state of the carrier fluid (which includes hydroxide materials) to address variations in bonding potential that release the contaminants from the solids for improved treatment. In some implementations, the electrochemical state of the contaminants may be also adjusted for improved separation from the solids and eventual destruction.

The overall system controls the electrochemical state of the contaminants and solids by electrolyzing a carrier fluid prior to its combination with (e.g., mixing with) the additives that are capable of reacting or interacting with the contaminants to thereby destroy the contaminants. The electrolyzed carrier fluid has a negative, reductive or reducing potential (excess of electrons), and the amount of charge can be adjusted to tailor the process to the removal or elimination of specific contaminants.

A fluid electrolyzer generates the electrolyzed carrier fluid and controls the electrical potential of the fluid by adjusting current density, which can be impacted by the total dissolved solids (e.g., hydroxide, contaminants) in the fluid, plate size and type, membrane type, voltage, fluid residence time, or a combination of these variables. This allows tailoring the carrier fluid potential to maximize the extraction efficiency of the target component within a lower operating cost structure. The overall system can also adjust and control the pH of the carrier fluid to improve efficiency of the process. With an increase of the potential used, typically the higher the pH (more basic) of the carrier fluid.

Figure 1:
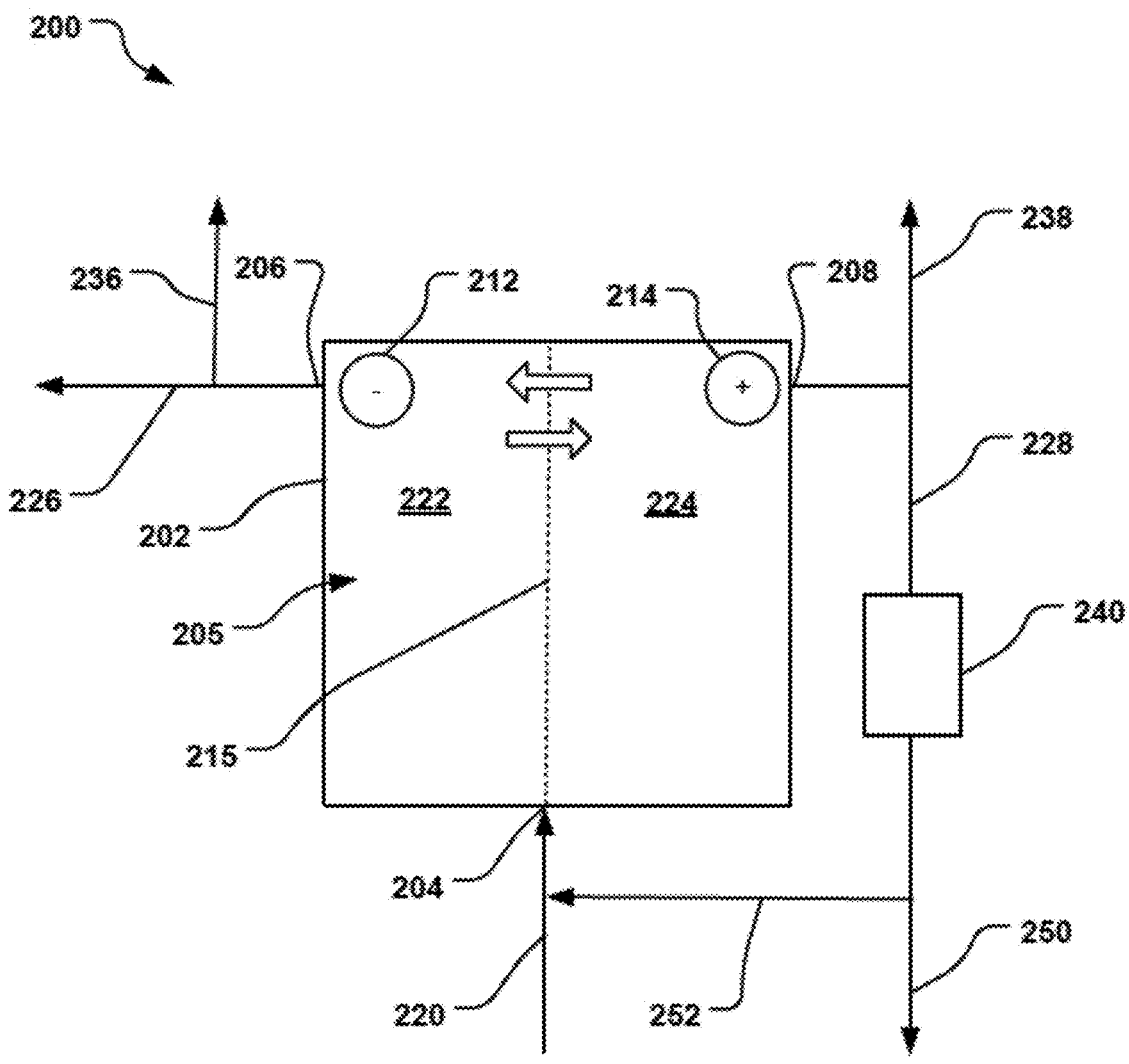
FIGS. 1 and 1A are schematic diagrams of various configurations of a fluid electrolyzation system in accordance with various embodiments described herein.

FIG. 1 schematically shows a fluid electrolyzation unit 200 for the production of an electrolyzed carrier fluid, suitable for use in removing contaminants from the solids components as described in greater detail below.

The electrolyzation unit 200 includes a vessel 202 for receiving and temporarily retaining a fluid (e.g., a liquid) therein. The vessel 202 has a fluid inlet 204 and a first fluid outlet 206 and a second fluid outlet 208, all fluidly connected to an interior 205 of the vessel 202.

The electrolyzation unit 200 has at least one pair, typically a plurality or series of pairs, of simple electrodes, one pair shown in FIG. 1 as a cathode 212 and an anode 214. The cathode 212 and the anode 214 may be made from any material that meets the desired application, such as titanium, graphite, platinum, stainless steel, iridium and the like. An electrical potential is present at the cathode 212 and the anode 214, provided by an appropriate voltage or potential source and wiring, not shown in FIG. 1. The potential applied is sufficient to raise the reductive oxidation-reduction-potential (ORP) to −800 mV or more.

Each pair of the cathode 212 and the anode 214 is separated by a permeable membrane 215 that is ion and electron permeable. Any membrane material capable of transferring ions across the membrane can be used for the membrane 215. The membrane 215 can be made from a wide range of materials, including as simple as cotton fibers, or as complex as various chlorofluoro carbon fibers; a traditional ion exchange membrane is a suitable membrane. The membrane 215 divides the interior 205 into a first portion or channel 222 between the membrane 215 and the cathode 212 and a second portion or channel 224 between the membrane 215 and the anode 214. The first channel 222 is fluidly connected to the outlet 206 and the second channel 224 is fluidly connected to the outlet 208.

The electrolyzation unit 200 includes appropriate input piping 220 connected to the inlet 204 to provide a hydroxide brine to the interior 205. The hydroxide brine may be a monovalent or divalent hydroxide, or a combination of various hydroxides, though in some embodiments, a monovalent hydroxide or mixture is preferred. Suitable hydroxides include, but are not limited to, NaOH, KOH, $Ca(OH)_2$, $Mg(OH)_2$ or various mixtures of hydroxides. In some embodiments, the hydroxide concentration in the brine is at a concentration of less than 1 wt-% salt, e.g., about 0.2 wt-%. In one particular implementation, calcium sulfate is converted to calcium hydroxide and used for the brine. Other suitable sulfates that can be used include, but are not limited to, lithium sulfate, sodium sulfate, potassium sulfate, and magnesium sulfate. These sulfates may also be mixed with various hydroxides to produce an effective brine.

The brine flows into the interior 205 into both channels 222, 224, although free to cross the membrane 215 at will. As the brine flows from the inlet 204 to the outlets 206, 208 in the channels 222, 224, it is electrolyzed by the charges on the cathode 212 and the anode 214 and is then separated by the permeable membrane 215 based on the resulting electrolyzation, as described in detail below.

The hydroxide brine acts as the conducting medium between the cathode 212 and the anode 214. The charge across the cathode 212 and the anode 214 causes anions to be attracted to anode 214 and cations to be attracted to the cathode 212. Thus, the brine is reduced at the cathode 212 to form a reduced electrolyzed fluid in the channel 222 and is oxidized at the anode 214 to form an oxidized electrolyzed fluid in the channel 224. Some of the variables that control the magnitude of the electrolytic process are the flow rate of the brine and the carrier fluid through the vessel 202, the charge potential between the cathode 212 and the anode 214, the fluid residence time in the vessel 202, and the amperage used to electrolyze the fluid.

The (reduced) electrolyzed carrier fluid having a reducing or reductive potential is discharged from the channel 222 via the outlet 206 and the (oxidized) electrolyzed carrier fluid having an oxidative or oxidizing potential is discharged from the channel 224 via the outlet 208. If multiple pairs of anodes/cathodes and membranes are present, all of the (reduced) electrolyzed carrier fluid in the channel(s) may be combined prior to flowing out of the vessel 202 via the outlet 206 and piping 226; similarly, all of the (oxidized) electrolyzed carrier fluid in the channel(s) may be combined prior to flowing out of the vessel 202 via the outlet 208 and piping 228.

The two electrolyzed fluid streams have a charge difference related to the dissolved constituents in the carrier fluid, current density across the cathode 212 and the anode 214, residence time in the electrolyzation unit 200, and other secondary factors. The residence time in the presence of a charge allows the carrier fluid and its dissolved solids to disassociate and the anions and cations to pass through the permeable membrane 215, thus separating the dissolved solids. The size, power requirements, and detailed configuration of the electrolyzation unit 200 and permeable membrane 215 (including membrane type) are dictated by the field specific requirements/applications.

The reduced electrolyzed carrier fluid from the outlet 206 and the piping 226 is an aqueous hydroxide solution (e.g., NaOH, at about 0.1 to 1.25 wt-%) with negative or reducing potential (excess of electrons). Typically, the potential is in the range of −500 mV to −1100 mV, sometimes in the range of −650 mV to −950 mV. This electrolyzed carrier fluid is basic or caustic, having a pH of at least 10, and sometimes at least 12, e.g., in a range of 12 to 13.5. The reduced electrolyzed carrier fluid stream, from the cathode 212, may include a gaseous component such as $H_2$, which can be off-gassed from the piping 226 via a vent 236. This gaseous component can be merely vented or can be collected and subsequently used.

The oxidized electrolyzed carrier fluid from the outlet 208 and the piping 228 is an aqueous hydroxide solution (e.g., NaOH at about 0.1 to 1.25 wt-%), with trace contaminants which can include, e.g., $Cl_2$, HOCl (which may only present when $Cl_2$ is also present as a contaminant), and $H_2O_2$. The oxidized electrolyzed carrier fluid will have a positive or oxidizing potential (lack of electrons). Various oxides may be present in the carrier fluid. In some embodiments, the potential of the oxidized electrolyzed carrier fluid is in the range of +1 mV to +500 mV. This electrolyzed carrier fluid can have a pH in the range of from about 9 to about 13.5, such as about 13. The oxidized electrolyzed carrier fluid stream may include a gaseous component such as $O_2$ and $O_3$, which can be off gassed from the piping 228 via a vent 238.

This gaseous component can be merely vented or can be collected and subsequently used.

The piping 228 is fluidly connected to a neutralization system 240 which can oxidize or otherwise neutralize contaminants such as $Cl_2$, oxides, and other reducing contaminants. The neutralization system 240 can also, e.g., adjust the pH of the fluid, modify or act on any dissolved solids therein, remove solids, or the like.

From the neutralization system 240, the cleansed, oxidized electrolyzed carrier fluid can be sent via piping 250 to a vessel, vat, or other vessel to be used for a different process or discarded. Alternately, from the neutralization system 240, the cleansed, oxidized electrolyzed carrier fluid can be recycled via line 252 and combined with fresh hydroxide brine at the inlet 204; recycling may occur, e.g., during a downtime of the treatment system or process.

In one particular example, when NaOH hydroxide brine at 0.2 wt-% to 1.0 wt-% is used as the input, a NaOH electrolyzed carrier fluid, having a pH in the range of 12.9 to 13.3 and a potential of −500 mV to −1000 mV, is obtained.

Not shown in FIG. 1, but operably connected to the electrolyzation unit 200 is various fluid processing equipment, such as a pump or pumping station that pumps the brine to the unit 200, a carrier fluid storage tank to retain the (oxidized) electrolyzed carrier fluid, etc. The brine may be filtered to remove any large pieces of solids or debris to prevent damage to the electrolyzation unit 200. Similarly, the electrolyzed carrier fluid produced by the unit 200 may be filtered, e.g., prior to the addition of additives as discussed in greater detail below. Additionally, any adjustments to the carrier fluid can be conducted at this point, if desired. These adjustments may be in the form of mineral addition (or removal) from the carrier fluid. Additionally, materials such as nano-particles, specific polymers or other materials such as wetting agents may be added to enhance the ability to release and carry a charge, or to enhance the ability to release contaminants. Any number of pumps, filters, pipes, valves, storage tanks, etc. may be used to achieve the desired operation.

Additional features and details applicable to the unit 200 can be found in U.S. Pat. No. 8,157,981 (Peters et al.), U.S. Pat. No. 8,333,883 (Peters et al.), U.S. Pat. No. 8,394,253 (Peters et al.), U.S. Pat. No. 9,445,602 (Peters et al.), and U.S. Pat. No. 10,676,663 (Breedlove et al.), the disclosures of all of which are incorporated herein by reference for all purposes.

Further, although the electrolyzation unit 200 and the electrolyzation process of the hydroxide brine (to form the carrier fluid) is described as a continuous process herein, the process may alternately be done as a batch process. For example, a basic electrolyzer may be constructed by using simple vessels (like tanks or barrels) with an electrode (cathode or anode) in each vessel and linked with a pipe separated by a membrane. In this batch approach, a flowing fluid may not be necessary.

Figure 1A:
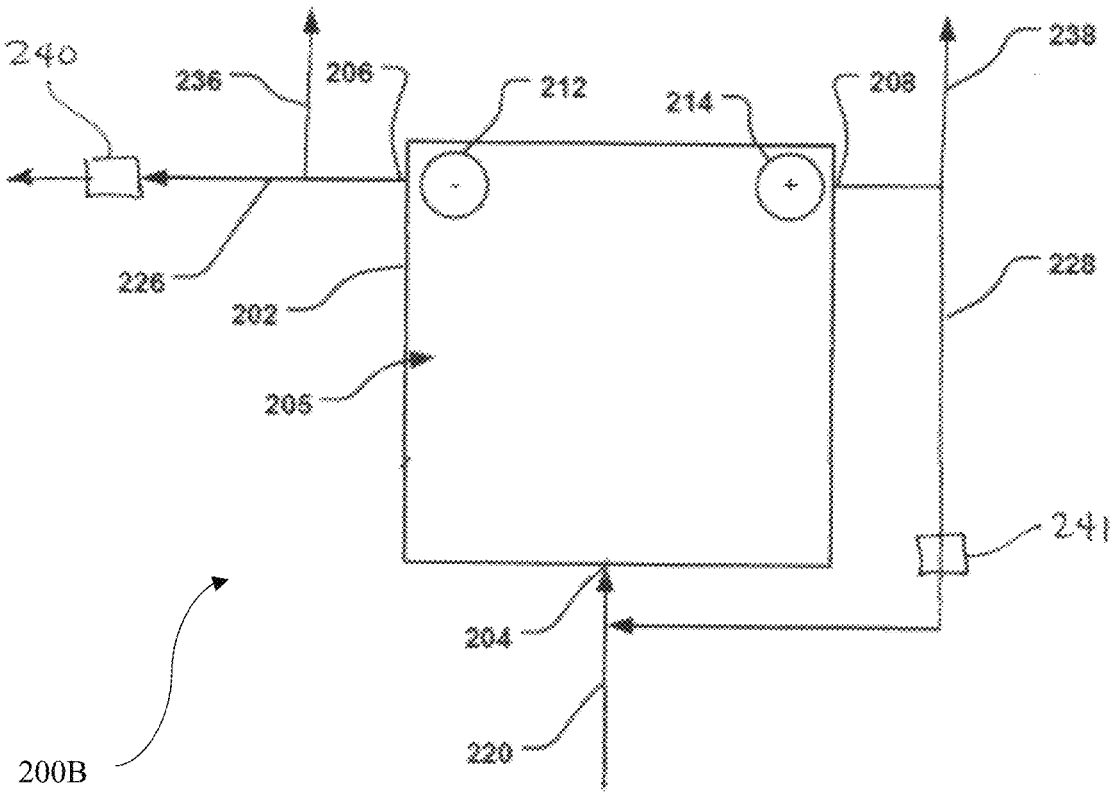

With respect to FIG. 1A, electrolyzation unit 200B is substantially identical to the electrolyzation unit 200 shown in FIG. 1 and described above, save for the absence of a membrane 215. Because electrolyzation unit 200B does not include a membrane 215, electrolyzation unit 200B is not divided in to a first and second portion. Regardless of the absence of the membrane 215 in unit 200B, the unit 200B still effectively operates to create the electrolyzed carried fluid as discussed in greater detail above with respect to electrolyzation unit 200. With respect to FIG. 1A, the brine flows into the entire interior 205 and is electrolyzed by the charges on the cathode 212 and the anode 214. Because the unit 200B of FIG. 1A does not include the membrane 215, there may be less separation of reduced and oxidized components, but primarily reduced electrolyzed carrier fluid will exit out of outlet 206 closet to the cathode 212, just as partially oxidized electrolyzed carrier fluid will exit out of outlet 208 closest to the anode 214.

Figure 2:
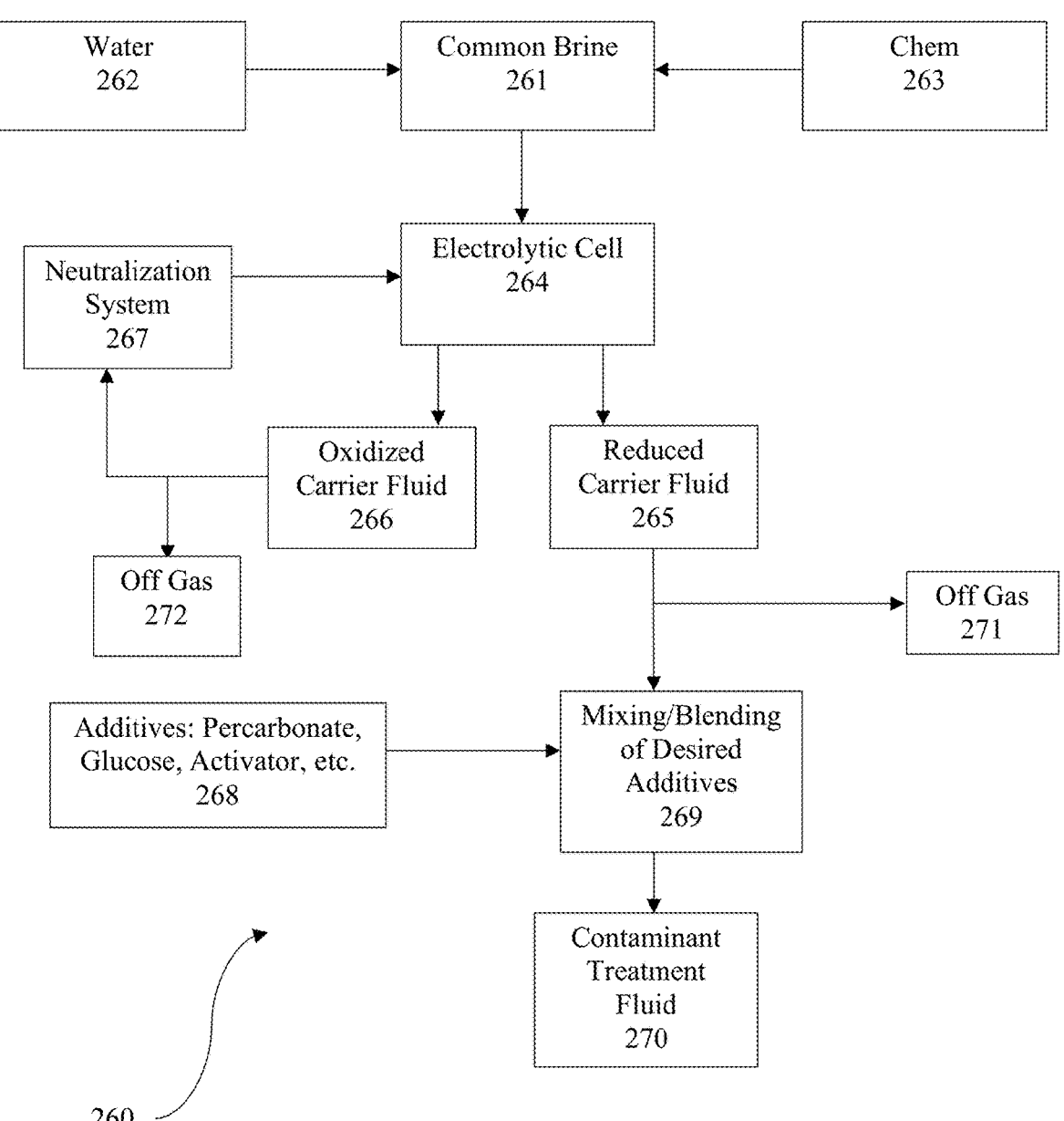
FIG. 2 is a flow chart of a contaminant treatment fluid generation system according to various embodiments described herein

FIG. 2 is a flow chart illustrating a process 260 for preparing a contaminant treatment fluid, the process which includes use of the electrolytic unit 200 described previously and illustrated in FIG. 1. In the process 260, a brine solution 261 is prepared via the mixing of water 262 and the appropriate chemical or chemicals 263. Preparation of the brine 261 is described in greater detail above with respect to FIG. 1 and inlet 204 used to provide a hydroxide brine to the interior 205 of unit 200. As described in more detail above, the chemical 263 may be a hydroxide such that mixing water and the hydroxide together forms a hydroxide brine 261.

The hydroxide brine 261 is then input into the electrolytic cell 264, which is described in greater detail above with respect to FIG. 1 and the electrolyzation unit 200. As described previously, the electrolytic cell 264 processes the hydroxide brine 261 to produce a reduced carrier fluid 265 and an oxidized carrier fluid 266. The reduced carrier fluid 265 and oxidized carrier fluid 266 are described in greater detail above with respect to the reduced electrolyzed carrier fluid from the outlet 206 and the oxidized electrolyzed carrier fluid from outlet 208 shown in FIG. 1.

With respect to oxidized carrier fluid 266, FIG. 2 illustrates this fluid being flowed to a capture or neutralization system 267. As discussed previously, neutralization system 267 is generally used to capture or otherwise neutralize contaminants such as halides, various oxides, and other oxidizing contaminants that may be present in the anodic carrier fluid 266. The neutralization system 267 is used to treat the fluid containing any dissolved oxides that remain after the separation/removal of oxidative gasses. The neutralization system 266 can also, e.g., adjust the pH of the fluid, modify or act on any dissolved solids therein, remove solids, or the like. In some embodiments, the neutralization system 267 utilizes a single or series of granular activated carbon (GAC) filters used to remove any remaining contaminates from the recycled fluid.

Once treated in the neutralization system 267, the oxidized carrier fluid comprises an aqueous hydroxide solution free or substantially free of contaminants, and can therefore be recycled back into the overall system for use as the initial hydroxide brine 261 to be fed into the electrolytic cell 264. Control systems can be used to monitor the amount and content of the hydroxide brine recycled back into the initial brine feed 261 and adjust the amount of additional water 262 and/or chem 263 supplied to the brine feed 261 to ensure that the brine 261 fed into the electrolytic cell 264 maintains the desired characteristics (e.g., concentration of hydroxide). Because the oxidized carrier fluid 266 produced by the electrolytic cell 264 is treated and recycled, the overall process of preparing the contaminant treatment fluid is more economical and produces less waste.

Reduced carrier fluid 265 produced by the electrolytic cell 264, and which is identical to the reduced electrolyzed carrier fluid from the outlet 206 described in greater detail above with respect to FIG. 1, is subsequently subjected to mixing/blending 269 with additional additives 268 that help prepare the final contaminant treatment fluid 270 that is suitable for use in lowering the level of contaminants (e.g., glyphosates, microbials, mycotoxins, etc.) on various food commodities. The specific additives 268 added to the carrier fluid 265 is generally dependent on the specific application of the final contaminant treatment fluid 270 and what specific contaminants are to be targeted. In some embodiments, only a single additive is added to the carrier fluid, while in other embodiments, multiple additives are added. In some embodiments, the addition of multiple additives makes the resulting contaminant treatment fluid capable of effectively reducing levels of multiple types of contaminants.

In some embodiments, an additive that is mixed or blended with the reduced carrier fluid is an oxidizer. Suitable oxidizers that may be used include, but are not limited to, sodium percarbonate, $Na_2H_3CO_6$ or $2Na_2CO_3 * 3H_2O_2$. Addition of an oxidizer to the carrier fluid can serve several functions when the contaminant treatment fluid is applied to a food commodity. In some embodiments, the oxidizer further assists with bringing contaminants present on the food commodity into solution, where it is then easier to destroy or otherwise treat. In some embodiments, the oxidizer is effective at killing microbials, due at least in part to the oxidizer making the treatment fluid more oxidative. In some embodiments, the oxidizer cleaves mycotoxins at certain bond locations within the mycotoxins to thereby break the mycotoxin into two or more fragments. Non-limiting examples of mycotoxins that can be cleaved via the oxidizer additives are aflatoxin, deoxynivalenol and zear-alenone.

In some embodiments, an additive that is mixed or blended with the reduced carrier fluid is a carbohydrate, including monosaccharides, disaccharides, and oligosaccharides. In some embodiments, the carbohydrate additive is preferably a monosaccharide such as glucose, fructose or galactose. The use of a carbohydrate additive allows for glucosylation to be carried out on contaminants such as mycotoxins in order to destroy the mycotoxins. In one specific, though non-limiting, example, glucosylation can be used to break the $NH_2$ bonds in fumonisin to thereby destroy this mycotoxin.

In some embodiments, an additive that is mixed or blended with the reduced carrier fluid is sulfuric acid or similar compound having a sulfonic acid functional group such that the additive is capable of carrying out sulfonation on a contaminant to thereby destroy the contaminant. In one specific, though non-limiting, example, sulfonation can be used to break bonds in aflatoxin and deoxynivalenol to thereby destroy these mycotoxins. Use of sulfuric acid and related acids may also lower the pH of the contaminant treatment fluid, making it more effective at killing microbial contamination.

As noted previously, any combination of these additives can be mixed/blended with the reduced carrier fluid, including using only one of the additives. For example, in some specific situations where the contaminant treatment fluid is to be used for treating food commodities known to have only microbial contamination, it may be preferable to add only the oxidizer additive, as addition of the carbohydrate and/or sulfuric acid additives may not appreciably increase the rate at which microbials are destroyed.

That being said, when multiple additives are combined with the reduced carrier fluid to create the contaminant treatment fluid, the contaminant fluid is generally capable of beneficially destroying multiple types of contaminants. For example, when all three types of additives are mixed/blended with the reduced carrier fluid, the resulting contaminant treatment fluid is capable of destroying microbials, glyphosate and mycotoxins. As such, the contaminant treatment fluid including all three additive types can be highly beneficial in that a single contaminant treatment fluid effectively reduces the levels of multiple types of contaminants that may be present on a food commodity. This is in contrast to requiring a different treatment fluid for each type of contaminant, which would increase both costs and time for treatment.

Use of contaminant treatment fluid having all three additives can also be beneficial in situations where one additive destroys a contaminant, but in the process of destroying the contaminant, creates another contaminant. For example, when the treatment fluid is used to destroy glyphosate present on a food commodity, the oxidative additive may destroy glyphosate by breaking it down into aminometh-ylphosphonic acid (AMPA). AMPA is another type of contaminant that can be a health risk upon consumption, and so further steps need to be taken to eliminate this newly created contaminant. When the contaminant treatment fluid including all three types of additives is used, the AMPA will be destroyed due to the presence of additional oxidation and hydrolysis.

As illustrated in FIG. 2, the process 260 may further include various off gas removal steps 271, 272. The removal of undesired gaseous components from either the reduced carrier fluid 265 or the oxidized carrier fluid 266 is similar or identical to the removal of gaseous components described in greater detail above with respect to vents 236 and 238 in FIG. 1. For the reduced carrier fluid 265, the undesired gaseous components should be removed prior to mixing or blending additives, while undesired gaseous components should be removed from the oxidized carrier fluid 266 prior to treatment in the neutralization system 267.

Figure 3:
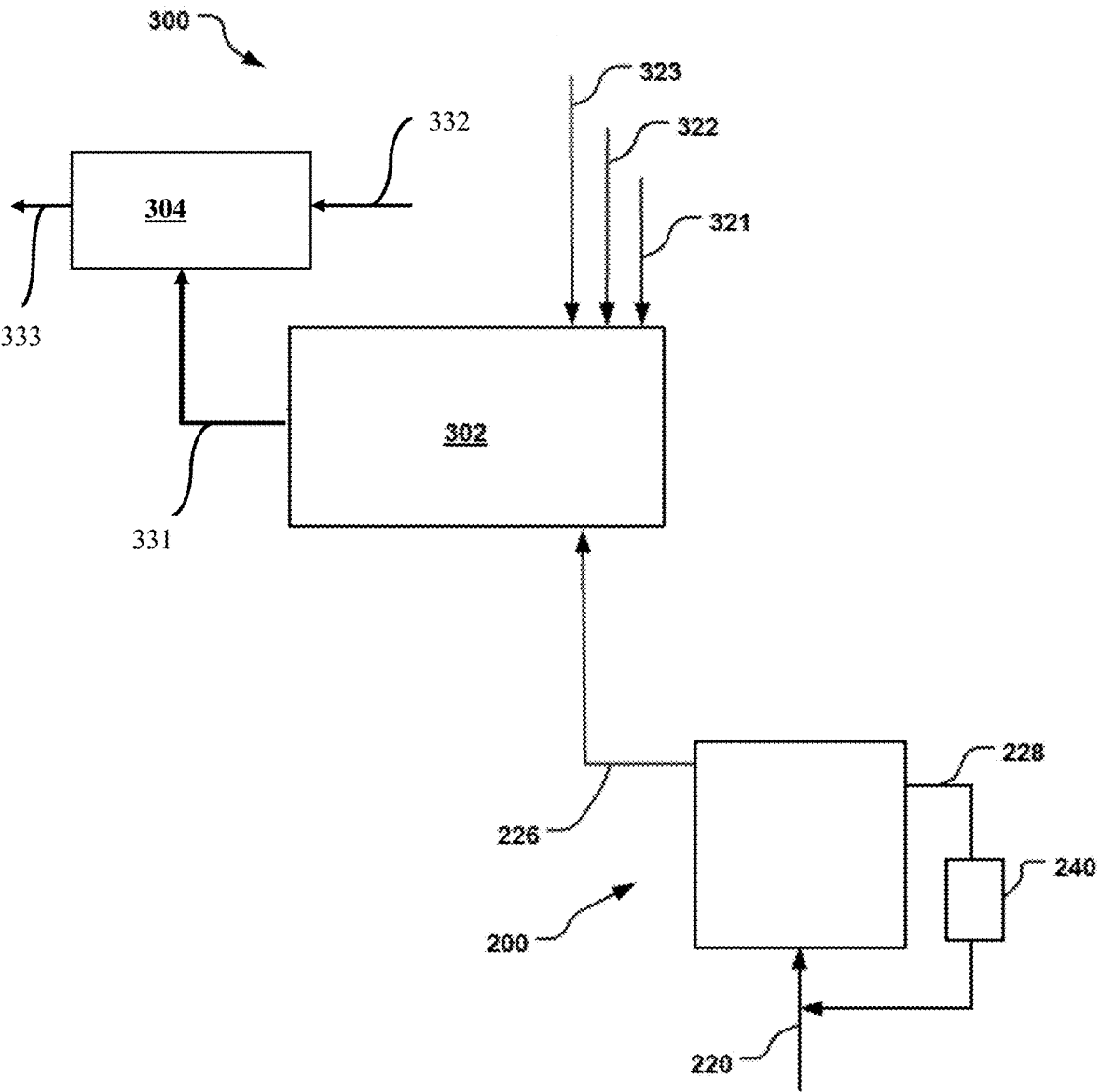
FIG. 3 is a schematic diagram of a system for producing a contaminant treatment fluid in accordance with various embodiments described herein.

FIG. 3 illustrates a production and application system 300 for the contaminant treatment fluid. The system 300 incorporates the electrolyzation unit 200 described in greater detail previously with respect to FIG. 1. As shown in FIG. 3, the electrolyzation unit 200 has input piping 220 providing hydroxide brine to the unit 200 which produces reducing electrolyzed carrier fluid that exits via the piping 226 and oxidizing electrolyzed carrier fluid that exits via the piping 228. Fluidly connected to the piping 228 for the oxidizing carrier fluid is a neutralization system 240, configured to remove oxides and any other contaminants desired before recycling the oxidizing carrier fluid back to the input piping 220.

The reduced, reductive, or reducing electrolyzed carrier fluid is fed via the piping 226 to a mixing vessel 302 where various additives inlets 321, 322, 323 are used to add additives as previously described to the reduced carrier fluid to thereby produce the contaminant treatment fluid. The additive inlets 321, 322, 323 may be for liquid, fluid, or solid additives. As described in greater detail previously, the additives are selected to kill, destroy, breakdown, eliminate or otherwise treat various classes of contaminants, such as microbials, mycotoxins and glyphosate. In some implementation, each inlet adds a different additive into the vessel 302. It is not necessary that each of the inlets 321, 322, 323 is used. For example, if only one additive is added, only one inlet may be used. Additionally, it is noted that although the inlets have sequentially numbered reference numbers, it is not necessary that the additives are added in the same order as the reference numbers assigned thereto.

In some embodiments, additive inlet 321 is used to add oxidizer additive (e.g., sodium percarbonate, $Na_2H_3CO_6$ or $2Na_2CO_3 * 3H_2O_2$) to the carrier fluid. The specific amount of oxidizer added is generally not limited, though specific exemplary (though non-limiting) amounts of oxidizer that may be added are discussed in greater detail below with respect to FIG. 4. In some embodiments, the amount of oxidizer added is selected such that the pH of the carrier fluid is reduced from about 13 to about 11.

In some embodiments, additive inlet 322 is used to add carbohydrate additive (e.g., glucose) to the carrier fluid. The specific amount of carbohydrate added is generally not limited, though specific exemplary (though non-limiting) amounts of carbohydrate that may be added are discussed in greater detail below with respect to FIG. 4.

In some embodiments, additive inlet 323 is used to add a sulfonic acid functional group-containing component (e.g., sulfuric acid) to the carrier fluid. The specific amount of sulfuric acid added is generally not limited, though specific exemplary (though non-limiting) amounts of sulfuric acid that may be added are discussed in greater detail below with respect to FIG. 4. In some embodiments, the amount of sulfuric added is selected such that the pH of the carrier fluid is reduced from about 11 (due to the previous addition of oxidizer) to about 9. Care should generally be taken with respect to the amounts of additives added so as to not further reduce the pH of the fluid below about 9 or else additional off gas may be created.

In some embodiments, the additives are added to the reduced carrier fluid serially, with mixing or blending of the reduced carrier fluid and each individual additive occurring prior to the addition of any subsequent additive. Any means for thoroughly mixing or blending each additive with the reduced carrier fluid can be used, including propellers, mixing blades, stir bars, etc. Mixing can generally be carried out for any suitable amount of time to ensure effective mixing or blending of the additive with the reduced carrier fluid. In one preferred embodiment, the sequence of serially added additives is oxidizer, followed by carbohydrate, followed by sulfuric acid; however, other sequences can also be used. In alternate embodiments, two or more additives are introduced into the mixing chamber 302 at the same time. Any combination of additives can be added to the mixing chamber 302 together. In some embodiments, all three additives are added into the mixing chamber 302 at the same time, and mixing or blending is carried out during or after the addition of all three additives to mix or blend the three additives with the reduced carrier fluid at the same time.

Upon addition of the desired additives and completion of the necessary blending or mixing, a contaminant treatment fluid is produced. Piping 331 may be used to remove contaminant treatment fluid from the mixing chamber 302. As shown in FIG. 3, piping 331 leads to a treatment vessel where the contaminant treatment fluid may be used to treat food commodities. Alternatively, it is possible for piping 331 to lead to a storage vessel for storage of the contaminant treatment fluid until it is ready for use with a contaminated food commodity.

The specific configuration of treatment vessel 304 is generally not limited and may be adjusted based on the specific food commodity being treated. In some embodiments, treatment vessel 304 may include any type of conveyance vessel for moving contaminated food commodity through the treatment vessel 304. As shown in FIG. 3, an inlet 332 is provided for conveying or otherwise introducing contaminated food into the treatment vessel 304, and outlet 333 is provided for conveying or otherwise removing treated food (i.e., food with lowered contaminant levels) from the treatment vessel 304. Treatment vessel 304 may be a close or open vessel, and may include other inlets or outlets as necessary, such as an outlet for used contaminant treatment fluid (which may have contaminants or broken-down contaminants loaded therein).

Any manner of contacting the food commodity moving through the treatment vessel 302 with the contaminant treatment fluid may be used provided that the food commodity is sufficiently contacted with the contaminant treatment fluid such that contaminants present on the food commodity are removed, destroyed, killed or otherwise eliminated from the food commodity, and that the food commodity is not appreciably damaged by the treatment fluid. In some embodiments, the application method is a bath-type application wherein the food commodity is briefly dipped into or otherwise conveyed through a bath of the contaminant treatment fluid. In such embodiments, the food commodity is typically exposed to the bath of treatment fluid for a relatively short period of time to ensure that the food commodity is not harmed by the treatment fluid. In some embodiments, exposure to the bath is less than 10 minutes, such as less than 5 minutes, or less than 3 minutes, such as in the range of from 2 to 3 minutes.

In other embodiments, the contaminant treatment fluid may be sprayed on to the food commodity. Any specific manner of spraying, submerging or otherwise coating the treatment fluid can be used, such as spraying the fluid down on the food commodity such that a gravitational effect can be used to ensure that the treatment fluid passes down and through the food commodity (such as when the food commodity is in the form of a particulate).

While the above embodiments are described with respect to a generally continuous-type treatment method, batch-type processing is also possible.

Regardless of the specific manner in which the food commodity is contacted with the treatment fluid, the aim of the treatment process is to separate the contaminants from the solid food commodity such that the contaminants are suspended in the treatment fluid. The electrolyzed carrier fluid directly alters the electrochemical state of the food commodity and/or the contaminant at their interface, allowing the contaminant to release off the surface of or from within pores in the food commodity. Once released from the food commodity and suspended in the carrier fluid, the contaminants are more susceptible to various treatments to destroy, kill, breakdown or otherwise eliminate the contaminants. Generally speaking, the various additives in the treatment fluid act on the contaminants separated from the food commodity to thereby destroy, kill, breakdown or otherwise eliminate the contaminants.

Regardless of the specific manner in which the food commodity is contacted with the contaminant treatment fluid, the treated food commodity may be subjected to post-treatment processing to, for example, rinse or remove treatment fluid from the treated food commodity and/or to dry the treated food commodity. In some embodiments, the treated food commodity is subjected to a shaking and/or spinning step to remove fluid, contaminant, and/or moisture from the treated food commodity. Optional washing steps, such as water rinsing steps, can also be used. Drying steps may also be employed as necessary, including in conjunction with optional washing steps as previously mentioned.

Figure 4:
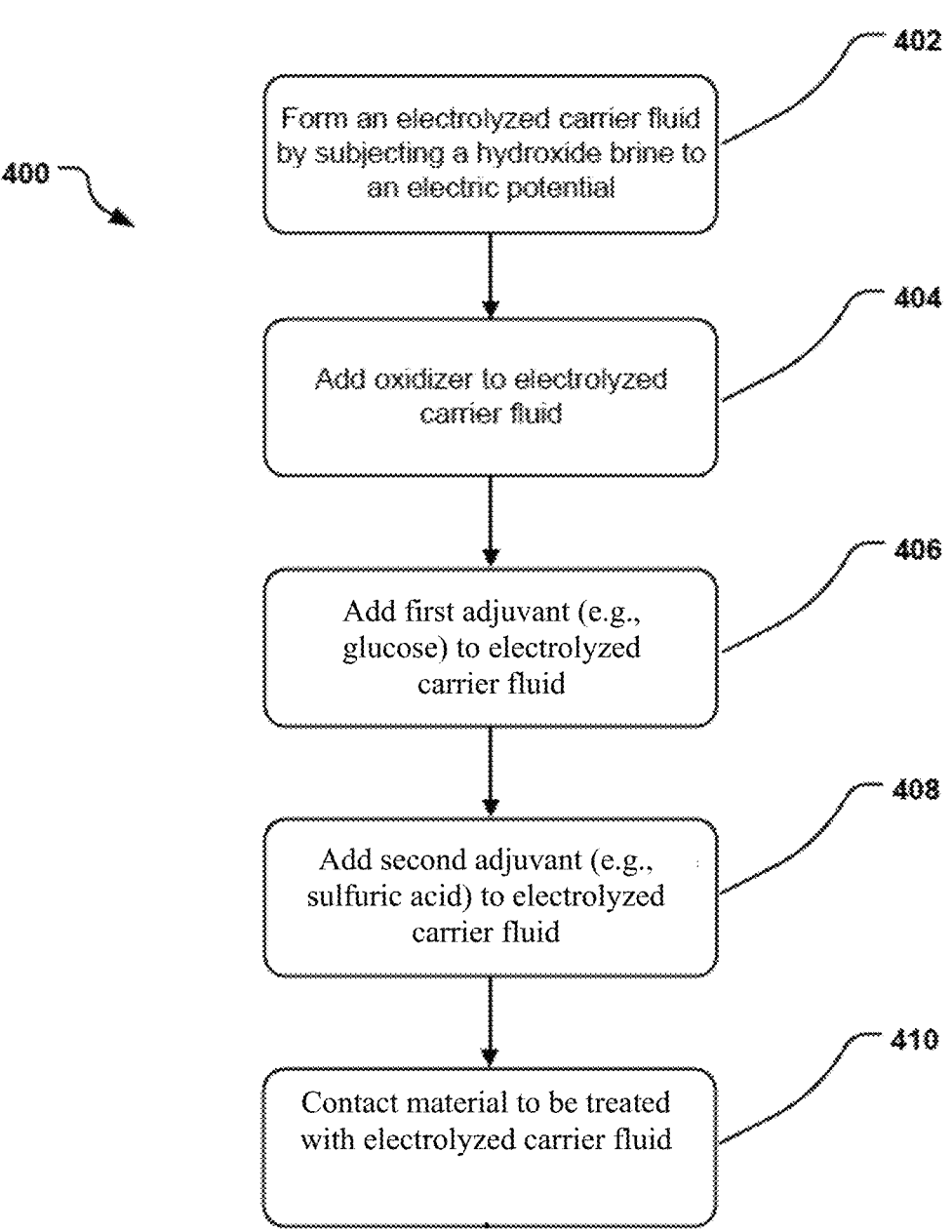
FIG. 4 is a step wise flow diagram of a method for treating food commodities to lower contaminant levels in accordance with various embodiments described herein.

FIG. 4 provides a general process 400 for treating food commodities with the contaminant treatment fluid described herein.

In step 402, an electrolyzed carrier fluid is formed by subjecting a hydroxide brine to an electric potential; the resulting electrolyzed carrier can have a negative potential. The formation of the electrolyzed carrier fluid is described in more detail above with respect to FIG. 1.

In step 404, a first additive, such as an oxidizer, is added to the electrolyzed carrier fluid. An example of a suitable oxidizer is sodium percarbonate. The oxidizer may be added to the carrier fluid at a level of, e.g., 10-100 grams per liter of carrier fluid (e.g., 2-5 g/l, e.g., 4 g/l). The amount of oxidizer added to the carrier fluid may be selected so as to reduce the pH of the carrier fluid from about 13 to about 11.

In step 406, a second additive, specifically a carbohydrate such as glucose, is added to carrier fluid. In some embodiments, the carbohydrate is added to the carrier fluid at a level of about 1-5 grams carbohydrate per liter of carrier fluid (e.g., 1-3 g/l, e.g., 2 g/l).

In step 408, a third additive, specifically sulfuric acid or other sulfonic acid functional group-containing compound, is added to and mixed with the carrier fluid. In some embodiments, the sulfuric acid is added to the carrier fluid at a level of about 1-5 ml of 10% sulfuric acid per 100 ml of carrier fluid (e.g., 1-3 ml/l, e.g., 2 ml/l). In some embodiments, the amount of sulfuric acid added to the carrier fluid is selected such that the pH of the carrier fluid can range from 8.5 to about 10.5 and have an ORP of about −50 mV to −300 mV.

In step 410, the contaminant treatment fluid is contacted with the food commodity. Specific methods for carrying out this contacting steps are described in greater detail above with respect to FIG. 3 and treatment vessel 304.

In some embodiments, the contaminant treatment fluid after use in treatment vessel 304 may have a pH of about 9 to 10.5 and an ORP of about −25 mV to −200 mV. In some embodiments, these ORP and pH ranges are obtained within 30 seconds to 5 minute after the addition of the contaminant treatment fluid to treatment vessel 304.

While the above-described embodiments focus primarily on an electrolyzed carrier fluid to which additives are added to thereby produce a contaminant treatment fluid and methods of preparing a contaminant treatment fluid including the step of producing an electrolyzed carrier fluid (such as through the use of an electrolytic cell), alternate embodiments of the technology described herein may not employ an electrolyzed carrier fluid. In such embodiments, one or more of the additives described previously are added to a non-electrolyzed brine solution in a similar or identical fashion to the embodiments described previously where the additives are added to an electrolyzed brine solution. Thus, in these alternative embodiments, the method of preparing a contaminant treatment solution is similar to the method illustrated in FIG. 2, except that the common brine 261 bypasses the electrolytic cell 264, and additives 268 are added directly to the common brine at step 269.

Figure 4A:
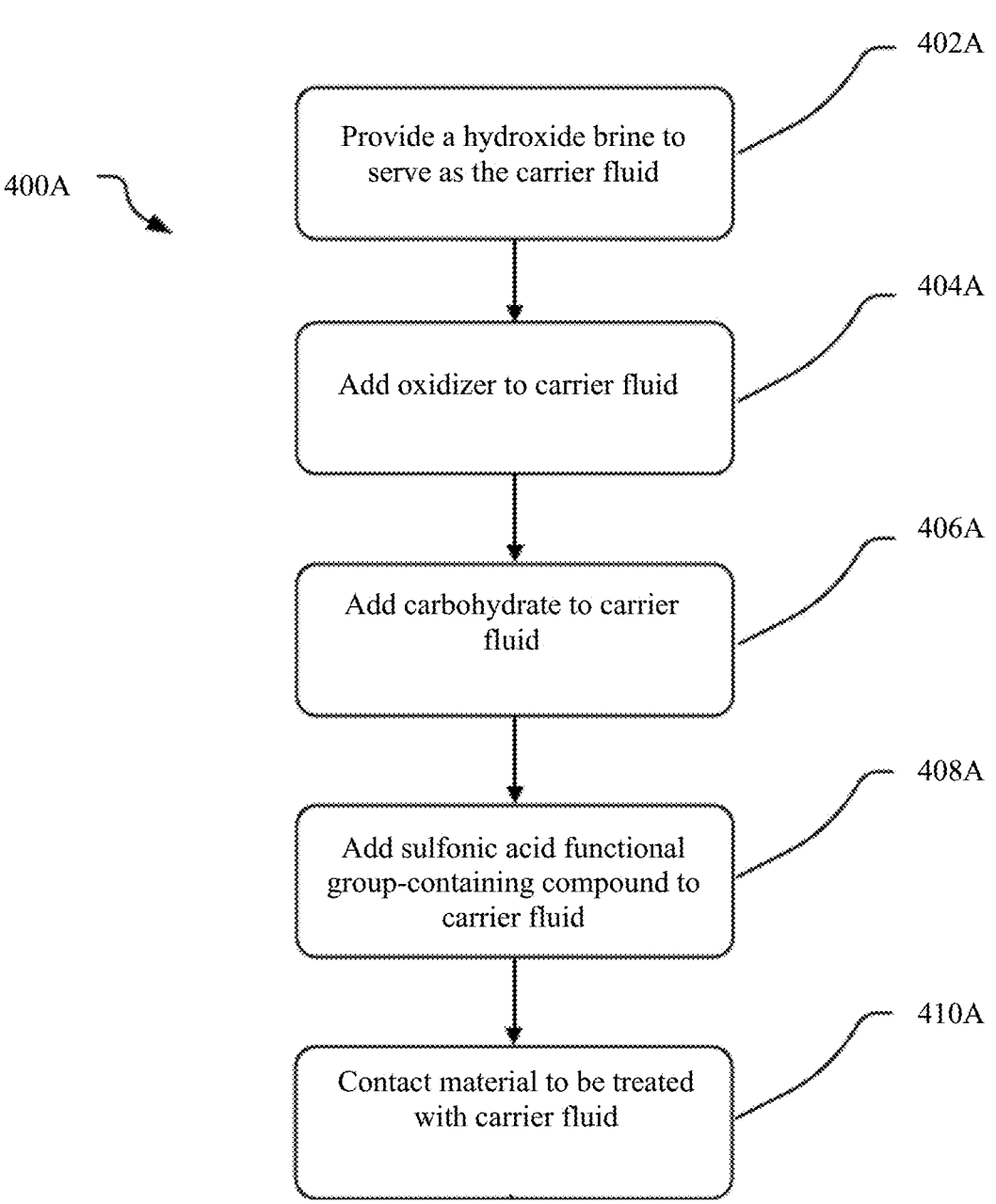
FIG. 4A is a step wise flow diagram of a method for treating food commodities to lower contaminant levels in accordance with various embodiments described herein.

FIG. 4A illustrates embodiments of a method 400A for producing a contaminant treatment fluid in which an electrolyzed carrier fluid is not employed. Instead, the method 400A calls for additives to be mixed directly with a common brine (i.e., a common brine not subjected to an electrolytic process and which therefore does not have an enhanced reductive or oxidative potential).

In step 402A of method 400A, a carrier fluid is provided. The carrier fluid may be or comprise a hydroxide brine. The hydroxide brine may include a monovalent or divalent hydroxide as the hydroxide component of the brine, or a combination of various hydroxides, though in some embodiments, a monovalent hydroxide or mixture is preferred. Suitable hydroxides include, but are not limited to, NaOH, KOH, Ca(OH)$_2$, Mg(OH)$_2$. or various mixtures of hydroxides. In some embodiments, the hydroxide concentration in the brine is at a concentration of from about 0.2 wt-% to about 5 wt-%, though in some embodiments, the hydroxide concentration is at the higher end of this range, such as from about 2.5 wt-% to about 5 wt-%. In one particular implementation, calcium sulfate is converted to calcium hydroxide and used for the brine. Other suitable sulfates that can be used include, but are not limited to, lithium sulfate, sodium sulfate, potassium sulfate, and magnesium sulfate. These sulfates may also be mixed with various hydroxides to produce an effective brine.

In step 404A, a first additive, such as an oxidizer, is added to the carrier fluid. An example of a suitable oxidizer is sodium percarbonate. The oxidizer may be added to the carrier fluid at a level of, e.g., 10-100 grams per liter of carrier fluid (e.g., 2-5 g/l, e.g., 4 g/l). The amount of oxidizer added to the carrier fluid may be selected so as to reduce the pH of the carrier fluid from about 13 to about 11.

In step 406A, a second additive, specifically a carbohydrate such as glucose, is added to carrier fluid. In some embodiments, the carbohydrate is added to the carrier fluid at a level of about 1-5 grams carbohydrate per liter of carrier fluid (e.g., 1-3 g/l, e.g., 2 g/l).

In step 408A, a third additive, specifically sulfuric acid or other sulfonic acid functional group-containing compound, is added to and mixed with the carrier fluid. In some embodiments, the sulfuric acid is added to the carrier fluid at a level of about 1-5 ml of 10% sulfuric acid per 100 ml of carrier fluid (e.g., 1-3 ml/l, e.g., 2 ml/l). In some embodiments, the amount of sulfuric acid added to the carrier fluid is selected such that the pH of the carrier fluid can range from 8.5 to about 10.5.

In step 410A, the contaminant treatment fluid is contacted with the food commodity. Specific methods for carrying out this contacting steps can be similar or identical to the steps described in greater detail above with respect to FIG. 3 and treatment vessel 304.

EXAMPLES

Example 1—Liquid aflatoxin standard was treated with the contaminant treatment fluid as described herein and the reaction was halted at designated times. Data was collected using an HPLC located at a third party contracted State University and is presented in FIGS. 5A-5C.

Example 2—Liquid fumonisin B1 standard was treated with contaminant treatment fluid as described herein and the reaction was halted at designated times. Data was collected using an HPLC located at a third party contracted State University and is presented in FIGS. 6A-6C.

Example 3—Liquid deoxynivalenol (vomitoxin) standard was treated with contaminant treatment fluid as described herein and the reaction was halted at 2 minutes. Data was collected using an HPLC located at a third party contracted State University and is presented in FIGS. 7A-7C.

Example 4—Liquid zearalenone standard was treated with contaminant treatment fluid as described herein and the reaction was halted at 2 minutes. Data was collected using an HPLC located at a third party contracted State University and is presented in FIGS. 8A and 8B.

Example 5—Powdered glyphosate and AMPA were treated with contaminant treatment fluid as described herein and the reaction was halted at 2 minutes. Data was collected using an HPLC located at a third party contracted State University and is presented in FIG. 9.

Example 6— Corn inoculated with *Enterococcus* spp. Was treated with contaminant treatment fluid as described herein to test microbial reduction capability. A third party contracted laboratory conducted the analytical testing, which is presented in FIG. 10.

As discussed previously, the technology described herein is broadly applicable to multiple types of food commodities. Exemplary, though non-limiting food commodities that can be treated using the compositions, methods, systems and equipment described herein include all types of grains, corn, nuts, spices or other particulate that may have contaminants thereon. Examples include chickpeas, maze, masa, canola and rapeseed, soybeans, soy hulls, wheat, wheat middling, millet, alfalfa, sorghum, milo, sugar cane, sugar beets, corn stalks, corn cobs, popcorn husks, sweet bran, silage, baleage, haylage, oats, barley, sunflower seeds and hulls, cottonseed, coconut, cocoa beans, olives, palm, grapeseed, nuts (e.g., peanut, almond) and spices (e.g., allspice, nutmeg, cinnamon, pepper, mustard seed, sesame seed).

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A method of making a contaminant treatment fluid, the method comprising the steps of:
  A) mixing the following components:
    i) an electrolyzed carrier fluid having a reductive potential;
    ii) an oxidizer;
    iii) a carbohydrate; and
    iv) a sulfonic acid functional group-containing compound to form a contaminant treatment fluid; and
  B) removing chlorine, chlorine-containing species, or both from the contaminant treatment fluid.

2. The method of claim 1, wherein adding the oxidizer is done before adding the carbohydrate, and adding the carbohydrate is done before adding the sulfonic acid functional group-containing compound.

3. The method of claim 1, wherein the oxidizer is sodium percarbonate.

4. The method of claim 1, wherein the carbohydrate is glucose.

5. The method of claim 1, wherein the sulfonic acid functional group-containing compound is sulfuric acid.

6. The method of claim 1, wherein the electrolyzed carrier fluid has a reductive potential of −900 mV to −1000 mV.

7. The method of claim 1, wherein the electrolyzed carrier fluid comprises hydroxide.

8. The method of claim 1, wherein the electrolyzed carrier fluid comprises NaOH or KOH.

9. The method of claim 1, wherein the oxidizer is mixed with the electrolyzed carrier fluid in an amount of 10 to 100 grams of oxidizer per liter of electrolyzed carried fluid.

10. The method of claim 1, wherein the carbohydrate is mixed with the electrolyzed carrier fluid in an amount of 1 to 15 grams of carbohydrate per liter of electrolyzed carried fluid.

11. The method of claim 1, wherein the sulfonic acid functional group-containing compound is mixed with the electrolyzed carrier fluid in an amount of 1 to 5 mL of sulfonic acid functional group-containing compound per 100 mL of electrolyzed carried fluid.

12. The method of claim 1, wherein mixing the electrolyzed carrier fluid having a reductive potential with the oxidizer, the carbohydrate, and the sulfonic acid functional group-containing compound to form a contaminant treatment fluid is carried out in a manner such that the contaminant treatment fluid has a pH of about 8.5 to about 10.5.

13. The method of claim 1, wherein mixing the electrolyzed carrier fluid having a reductive potential with the oxidizer, the carbohydrate, and the sulfonic acid functional group-containing compound to form a contaminant treatment fluid is carried out in a manner such that the contaminant treatment fluid has an reductive potential of about −50 mV to about −300 mV.

14. A method of lowering contaminant levels in a food commodity, the method comprising:
  A) contacting the food commodity with the contaminant treatment fluid of claim 1; and
  B) separating the contaminant treatment fluid from the food commodity.

15. The method of claim 14, wherein contacting the food commodity with the contaminant treatment fluid comprises submerging at least a portion of the food commodity in a bath of the contaminant treatment fluid for a period of time.

16. The method of claim 14, wherein contacting the food commodity with the contaminant treatment fluid comprises spraying the food commodity with the contaminant treatment fluid.

17. The method of claim 14, wherein separating the contaminant treatment fluid from the food commodity comprises rinsing the food commodity with water.

18. The method of claim 14, wherein separating the contaminant treatment fluid from the food commodity comprises shaking or spinning the food commodity.

19. The method of claim 14, wherein the food commodity comprises grains.

20. The method of claim 1, wherein during the step of mixing an electrolyzed carrier fluid having a reductive potential with an oxidizer, a carbohydrate, and a sulfonic acid functional group-containing compound to form a contaminant treatment fluid, no chlorine or chlorine-containing species is actively added when forming the contaminant treatment fluid.

* * * * *